March 25, 1958  A. J. PONCELET  2,828,179
RECORDING SPEEDOMETER
Filed Jan. 24, 1955  4 Sheets-Sheet 1

INVENTOR.
ARTHUR J. PONCELET
BY
Frederick Diehl
ATTORNEY

March 25, 1958 A. J. PONCELET 2,828,179
RECORDING SPEEDOMETER

Filed Jan. 24, 1955 4 Sheets-Sheet 2

INVENTOR.
ARTHUR J. PONCELET
BY
Frederick Diehl
ATTORNEY

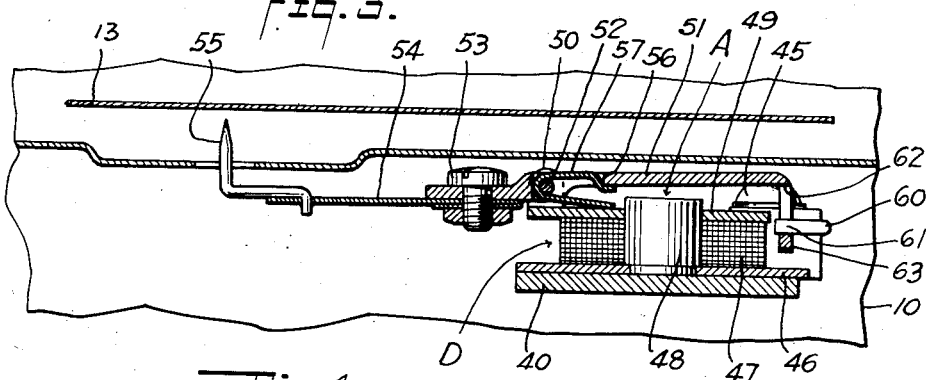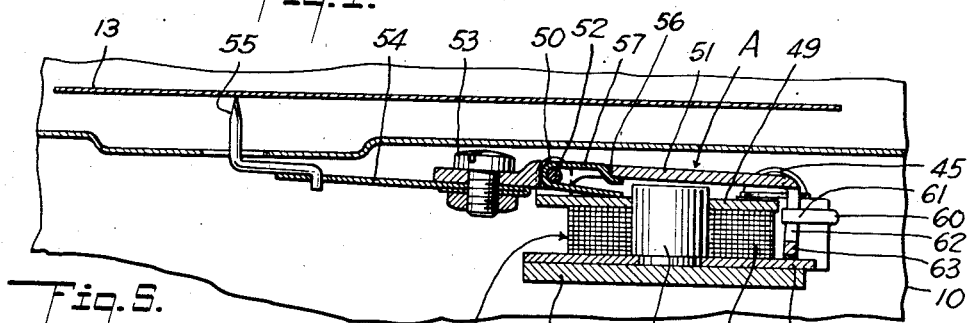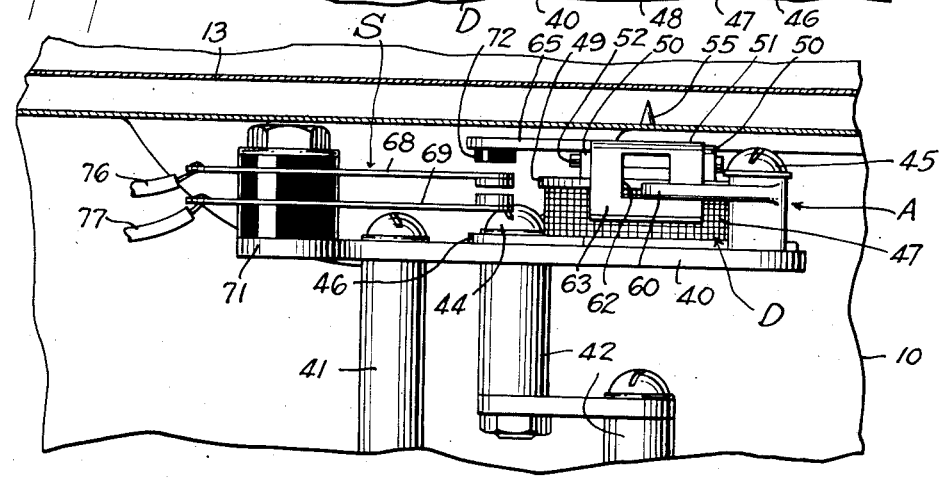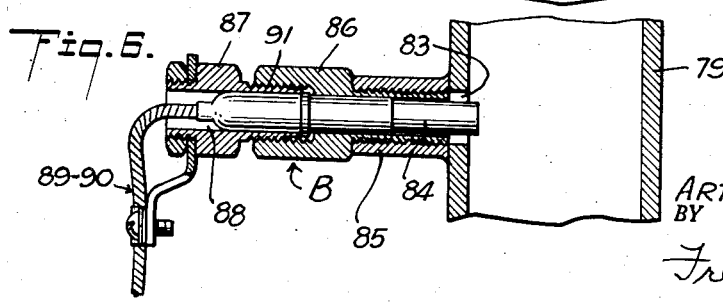

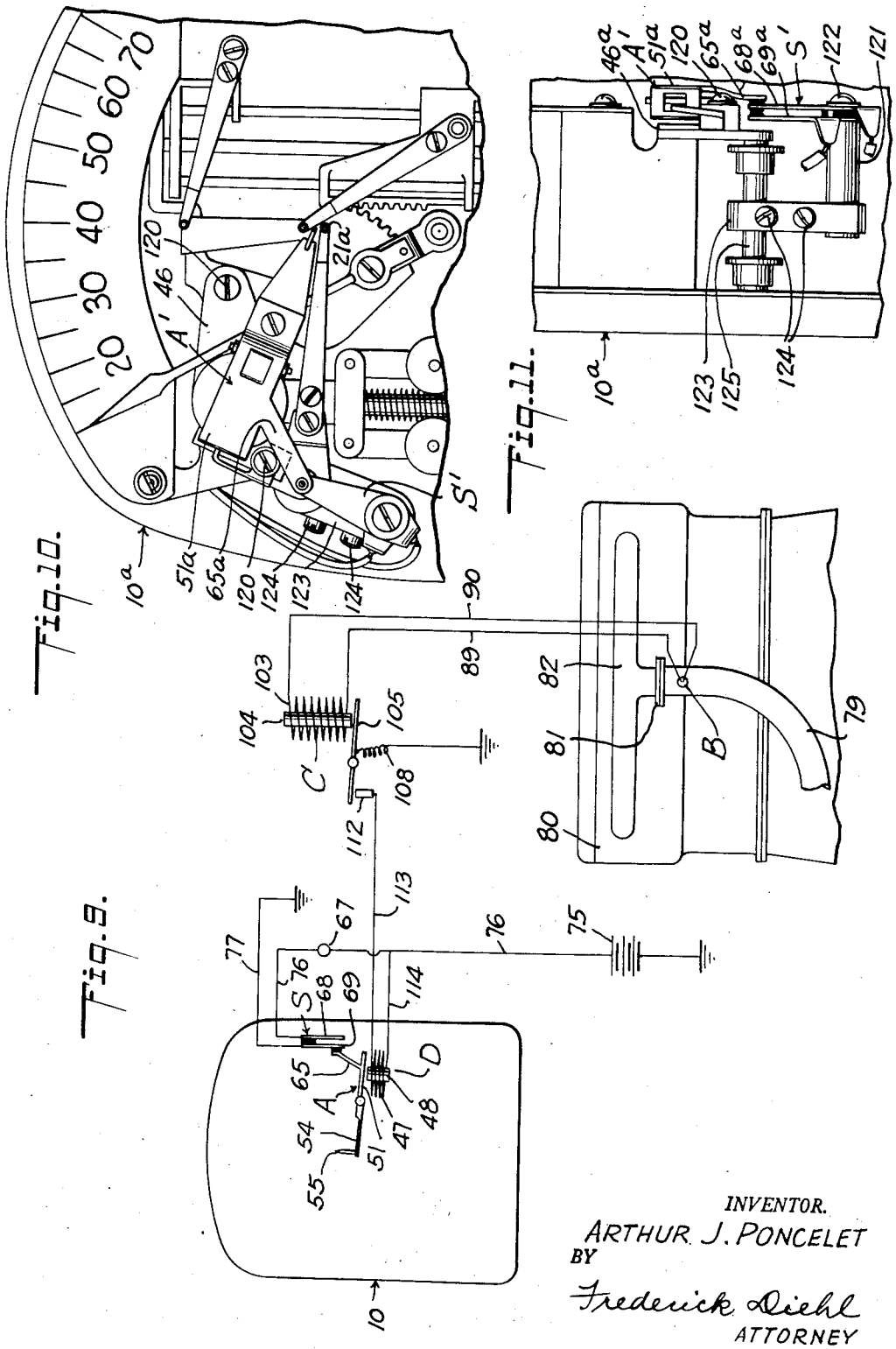

United States Patent Office 2,828,179
Patented Mar. 25, 1958

2,828,179

RECORDING SPEEDOMETER

Arthur J. Poncelet, Hemet, Calif.

Application January 24, 1955, Serial No. 483,779

1 Claim. (Cl. 346—141)

My invention relates generally to automatic record making mechanisms, and more particularly to recording speedometers as used on motor trucks, buses and other types of vehicles to record various useful facts relating to the operation of such vehicles.

Recording speedometers as heretofore proposed record on a suitable chart various movements of a vehicle such as the time when the engine is started; the amount of time the engine has idled; when the truck started to move, how fast it has traveled, when it stopped, and the distance traveled between stops, all to the end of providing an accurate performance and operational record of the vehicle.

An object of my invention is to provide a device which in one of its adaptations is operable in conjunction with the mechanism of a recording speedometer of the above described character, to record on the chart thereof any operation of the vehicle's engine at a temperature in excess of a predetermined safe temperature according to the engine manufacturer's specifications, thus enabling the engine and its operation by the driver to be checked in order to determine whether the engine requires servicing or the driver is at fault by overloading the engine, all to the end of reducing operating costs.

Another object of my invention is to provide a recording speedometer embodying an engine temperature recording mechanism as above set forth, which includes a visual signal correlated with the mechanism to indicate to the operator whenever excess engine temperature is being recorded, so that the operator may have the opportunity to remedy the condition should it be caused by overloading the engine as a result of failing to change to a lower gear when necessary to prevent damage to the engine.

Still another object of my invention it to provide an engine temperature recording mechanism of relatively simple, compact and rugged construction which utilizes a presently unused time graduated band or circle of a conventional recording speedometer chart to record the time and duration of excess engine temperature, and which may be incorporated in a recording speedometer as at present manufactured, with negligible modification thereof, thus greatly facilitating the use of the mechanism in recording speedometers now in use as well as in the course of production, to the end that the extremely important and vital advantage of the mechanism may be had at a minimum increase in the cost of the instrument.

With these and other objects in view, my invention resides in the combinations, arrangements and functional relationships of elements as set forth in the following specification and particularly pointed out in the appended claim.

In the accompanying drawings,

Figure 3 is an enlarged fragmentary sectional view taken on the line 3—3 of Figure 1 and illustrating the chart marking device with its stylus in an inactive position;

Figure 4 is a view similar to Figure 3 and illustrating the stylus in an active position as a result of operation of the engine at a temperature in excess of a predetermined safe operating temperature;

Figure 5 is a view of the chart marking device in side elevation;

Figure 6 is a longitudinal sectional view illustrating a thermocouple applied to the exhaust pipe of an engine for use in controlling a relay circuit in accordance with the exhaust temperature of the engine;

Figure 9 is a diagrammatic view illustrating the electrical circuits embodied in my invention;

Figure 10 is a fragmentary view in front elevation illustrating a second form of my invention applied to another well known model of recording speedometer; and Figure 11 is a fragmentary view in side elevation of the second form of my invention as shown in Figure 10 applied to the respective recording speedometer.

Figure 1:
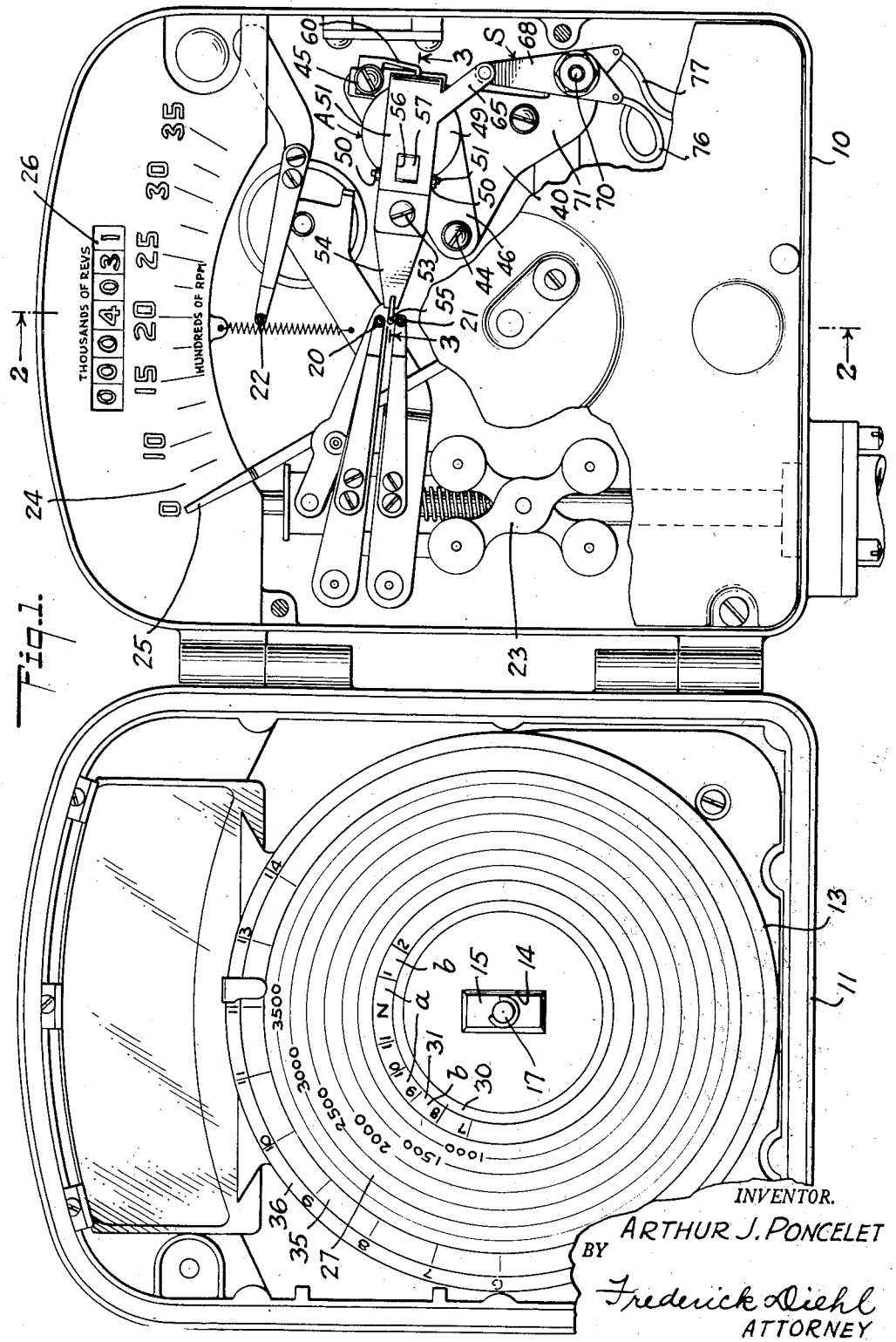
Figure 1 is a view in front elevation showing one form of chart marking device embodying my invention installed in one well known model of recording speedometer now in use, and illustrating the case of the instrument opened to expose its mechanism and the inner side of the cover.
Figure 2:
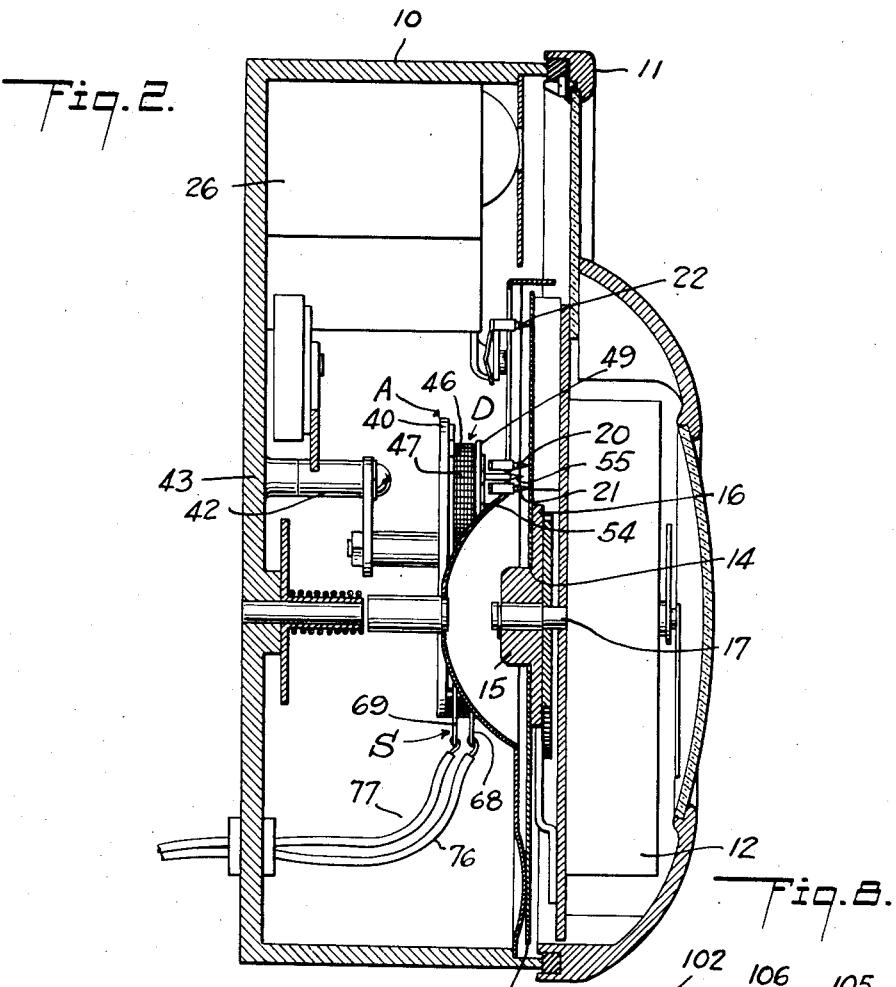
Figure 2 is a vertical sectional view taken on the line 2—2 of Figure 1.
Figure 7:
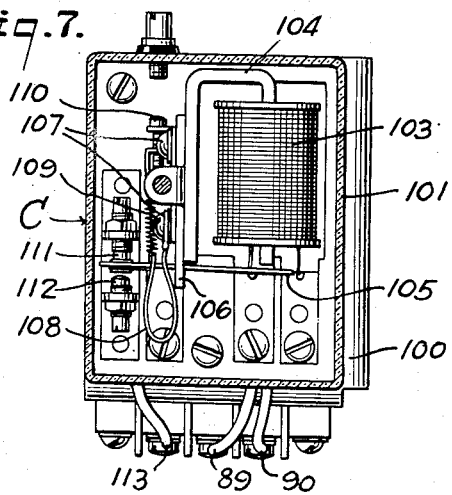
Figure 7 is a plan view of a relay which is interposed between the thermocouple and the chart marking device to control the operation of the latter in accordance with the action of the thermocouple.
Figure 8:
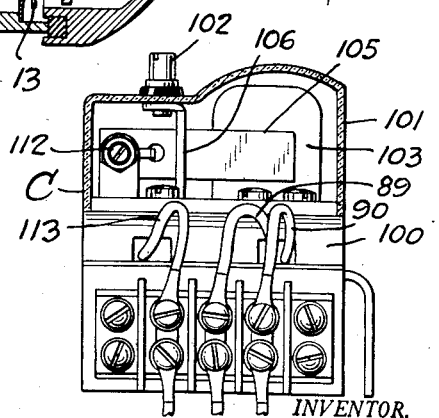
Figure 8 is a view showing the relay of Figure 7 in side elevation with its cover in section.

Referring specifically to the drawings and particularly to Figures 1 to 9, inclusive, this form of my invention broadly comprises one form of chart marking device A, a thermocouple B, and a relay C electrically associated therewith to control the operation of the chart marking device in accordance with the action of the thermocouple in responding to variations in the exhaust temperature of an engine.

For the purpose of illustration the chart marking device A is shown as being incorporated in a recording speedometer manufactured as Model BB under the name "Sangamo Tachograph," which will now be briefly described.

This speedometer is constructed to provide a generally rectangular case body 10 and a hinged cover 11 closing the open front of the body and capable of being locked in closed position. Mounted in the cover 11 is a spring wound clock 12 which drives a conventional twenty-four hour chart 13 having a centrally located rectangular opening 14 receiving a complementarily shaped stud 15 projecting from a disk 16 fixed to a shaft 17 positively driven by the clock in synchronism therewith.

The chart 13 is removable from the stud 14 and is confined against rotational and axial displacement relative to the stud when the cover is closed, for co-action of various portions of the chart with styluses 20, 21 and 22, respectively, operated by suitable mechanisms and yieldingly bearing against the waxed and printed surface of the chart so as to scribe through the wax and expose the colored face of the chart to produce various marks on the latter, all of which will be clearly understood by those familiar with the art.

The stylus 20 is operated by a conventional speedometer mechanism 23 driven by the usual speedometer cable (not shown) and having a dial 24 graduated to co-act with a pointer 25 in indicating engine revolutions per minute in this model. The speedometer mechanism includes a revolution counter 26 driven by the speedometer cable. The stylus 20 is operable to mark a circular band 27 on the chart 13 which is correspondingly graduated as shown in Figure 1, to indicate engine revolutions.

The stylus 21 is operable to mark a circular band 30 which is disposed on the chart 13 within the band 27 and is separated therefrom by a time band 31 suitably graduated to indicate hours and fractions thereof. The function of the stylus 21 is to indicate on the band 30 by three distinctively different markings scribed thereon whether the engine is stopped, whether it is idling, and when the truck is in motion.

The stylus 22 is operated from the speedometer mechanism in synchronism therewith and is oscillated to produce a saw tooth graph on the chart across a circular band 35 located between the outer time band 36 and the engine revolution band 27 to provide a record of miles traveled, all of which will be clearly understood by those skilled in the art.

My invention is operable in conjunction with the styluses 20, 21 and 22 and is operatively associated with the recording speedometer to utilize the presently unused time band of the chart previously referred to by 31, by marking thereon the time and duration thereof at which the engine is being operated at a temperature in excess of a predetermined safe operating temperature. For this purpose the chart marking device embodied in my invention is supported at a convenient location in the case body 10 of the speedometer as shown in Figures 1 to 5, inclusive, and comprises a bracket 40 of generally triangular outline in plan. This bracket is fixed to posts 41 and 42 rigidly secured to the rear wall 43 of the body 10. Secured by screws 44 and 45 to the bracket is the end frame plate 46 of an electromagnet D the winding 47 of which is mounted on the core 48 of the electromagnet between the frame plate and the end plate 49 which latter is in the form of a disk of non-magnetic metal.

Projecting from the periphery of the plate 49 are spaced ears 50 between which an armature 51 is received and mounted between its ends for pivotal movement on a pin 52. Fixed to one end of the armature 51 by a screw 53 is a spring arm 54 to the free end of which latter is fixed a stylus 55 disposed between the styluses 20 and 21 so as to be directly opposite the middle of the time band 31 of the chart 13.

The armature 51 is provided with an opening 56 receiving a flat type spring 57 which is return bent around the pin 52 and bears at its free ends against the plate 49 and the armature to urge the latter to the extreme position shown in Figure 3 wherein the stylus 55 is spaced from the chart 13 so as to be incapable of marking the chart. This extreme position of the armature is definitely limited by a stop arm 60 secured to the plate 46 by the screw 45 and angularly bent at its free end as indicated by 61 to project into an opening 62 in the angularly projecting end portion 63 of the armature 51 as clearly shown in Figures 3 to 5, inclusive.

Projecting rigidly from one side of the armature 51 is an operating arm 65 for a switch S controlling a red warning lamp 67 (Figure 9) which may be mounted at any location on the instrument panel of the vehicle convenient for observation by the operator. The switch S is composed of spring contact arms 68 and 69 insulated from each other and supported by a screw 70 on a lateral extension 71 of the plate 40, with the free end of the arms 68 and 69 directly opposite the free end of the operating arm 65.

The operating arm 65 is provided with an insulated button 72 which, upon energization of the electromagnet D to move the armature 51 to the extreme position shown in Figure 4, closes a circuit to supply current to the lamp 67 from a battery 75 through conductors 76 and 77, the latter of which is grounded as is one side of the battery, all as shown in Figure 9.

Energization of the electromagnet D is effected by closing of a relay circuit including the relay C, under the control of the thermocouple B which, as shown in Figures 6 and 9, is supported on the exhaust pipe 79 of the engine 80 adjacent to the flanged connection 81 of the exhaust pipe to the exhaust manifold of the engine indicated at 82. For this purpose an opening 83 of sufficiently large diameter to freely receive the thermocouple tube 84 is drilled through the outer side of the exhaust pipe, and an internally threaded sleeve 85 is welded to the pipe over the opening to dispose the latter co-axially of the sleeve.

The tube 84 is secured in the body 86 of the thermocouple B by a plug 87 threaded into the body and having a bore 88 through which the two conductors 89 and 90 of the thermocouple extend. The body 86 has a threaded shank 91 which is screwed into the sleeve 85 to rigidly support the thermocouple on the exhaust pipe 79 with the tube 84 projecting a short distance into the pipe as shown in Figure 6, so as to be exposed directly to the heat of exhaust gases flowing through the pipe.

The relay C which may be mounted on the engine side of the firewall or other location, comprises a rectangular base 100 to which a cover 101 is secured by a screw 102 to enclose an electromagnet the winding 103 of which is mounted on one leg of a U-shaped core 104. An armature 105 is pivoted intermediate its ends on a bracket 106 secured to the other leg of the core 104 by screws 107, to one of which a flexible conductor 108 leading from the armature is connected so as to ground the armature. A spring 109 connected to the armature and to a tension adjusting screw 110 on the bracket 106, normally urges the armature into engagement with a stop 111.

As shown in Figure 9, the thermocouple conductors 89 and 90 are connected to the ends of the relay winding 103 so that when the exhaust gases flowing through the exhaust pipe 79 reach a predetermined temperature at which it is unsafe to operate the engine, sufficient current will flow through the thermocouple circuit to energize the relay C and cause the armature 105 to engage a contact 112 which is connected by a conductor 113 to one end of the winding 47 of the electromagnet D. As the other end of the winding 47 is connected to one side of the battery 75 by the conductor 76 and a conductor 114, closing of the relay circuit through the relay contact 112 and the grounded armature 105 will energize the electromagnet D and its armature 51 to move the stylus 55 into engagement with the surface of the time band 31 as shown in Figure 4, and mark the chart by a dot or line *a* or *b*, respectively (Figure 1), depending on the length of time the engine continues to operate at a temperature in excess of the predetermined maximum operating temperature. The operator will be apprised of the unsafe operation of the engine by lighting of the warning lamp 67 through the switch S which has been closed by energization of the electromagnet D.

Reference will now be had to Figures 10 and 11 which illustrate the chart marking device A' installed in the case body 10a of a recording speedometer manufactured as Model A under the name "Sangamo Tachograph." The device A' is identical in construction and operation to the form of device A previously described, with the exception that the bracket 40 and posts 41 and 42 of the latter are dispensed with and the end plate 46a is mounted directly in the case body 10a by screws 120. In order to accommodate the switch S' for the warning lamp 67, the spring contact arms 68a and 69a of this switch are supported on a post 121 by a screw 122 and are insulated from each other and from the post.

The post 121 is carried by an arm 123 fixed by screws 124 to a rock shaft 125 to which is fixed a stylus 21a corresponding in function to the stylus 21 of the previously described model BB. The free ends of the contact arms 68a and 69a and the free end of the operating arm 65a projecting from the armature 51a are directly opposite each and in coaxial relationship to the axis of the rock shaft 124, so that irrespective of the position of the latter in its rocking movements the operating arm 65a will always be disposed to control the switch S'. The construction and operation of this form of my invention are identical to the form previously described in performing the same functions, so that further description will be dispensed with.

I claim:

In a recording speedometer having a clock-driven chart provided with a circular time band graduated into divisions of time, a chart marking device comprising: an electromagnetic body having end plates; means co-actable with one of said plates to support said body in the speedometer; the other of said plates having spaced ears; a pin supported by said ears and mounting the armature intermediate its ends for pivotal movement; a stylus carried by the armature at one end thereof for movement by the armature to engage or disengage the time band of said chart according as said body is energized or deenergized; said armature having an opening therethrough at said pin; a flat type spring received in said opening and return bent about said pin to bear at its ends against the armature and said other plate and urge the armature to the position wherein said stylus is disengaged from the chart; the other end of said armature having a laterally projecting portion provided with an opening; and a stop arm supported on said one of the plates and projecting into said opening to definitely limit the extreme position of the armature under the action of said spring.

References Cited in the file of this patent

UNITED STATES PATENTS

| | | |
|---|---|---|
| 1,198,953 | Phelps | Sept. 19, 1916 |
| 1,264,277 | Cook | Apr. 30, 1918 |
| 1,364,227 | Wight | Jan. 4, 1921 |
| 2,115,410 | Cooper | Apr. 26, 1938 |
| 2,189,112 | Jones et al. | Feb. 6, 1940 |
| 2,423,479 | Caldwell | July 8, 1947 |
| 2,519,925 | Okuniew | Aug. 22, 1950 |
| 2,653,853 | Goodwin | Sept. 29, 1953 |